(12) United States Patent
Oami

(10) Patent No.: US 12,339,941 B2
(45) Date of Patent: Jun. 24, 2025

(54) BIOMETRIC AUTHENTICATION DEVICE, BIOMETRIC AUTHENTICATION METHOD, AND BIOMETRIC AUTHENTICATION PROGRAM

(71) Applicant: NEC Corporation, Tokyo (JP)

(72) Inventor: Ryoma Oami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 241 days.

(21) Appl. No.: 17/799,976

(22) PCT Filed: Feb. 21, 2020

(86) PCT No.: PCT/JP2020/007076
§ 371 (c)(1),
(2) Date: Aug. 16, 2022

(87) PCT Pub. No.: WO2021/166223
PCT Pub. Date: Aug. 26, 2021

(65) Prior Publication Data
US 2023/0083281 A1    Mar. 16, 2023

(51) Int. Cl.
*G06F 21/32*    (2013.01)
*H04N 23/67*    (2023.01)

(52) U.S. Cl.
CPC .......... *G06F 21/32* (2013.01); *H04N 23/675* (2023.01)

(58) Field of Classification Search
CPC .............................. G06F 21/32; H04N 23/67
See application file for complete search history.

(56) References Cited

U.S. PATENT DOCUMENTS

2009/0278658 A1* 11/2009 Higashiyama ......... G06V 40/19
                                                                                                                      340/5.82
2010/0034529 A1    2/2010   Jelinek
(Continued)

FOREIGN PATENT DOCUMENTS

JP     2004-226729 A    8/2004
JP     2006-221422 A    8/2006
(Continued)

OTHER PUBLICATIONS

International Search Report for PCT Application No. PCT/JP2020/007076, mailed on May 19, 2020.
(Continued)

*Primary Examiner* — Noam Reisner

(57) ABSTRACT

A biometric authentication device, by utilizing difference distance information obtained on the basis of in-focus information indicating the degree of focusing in an image of a subject serving as the target of biometric authentication and an estimated distance to the subject obtained from the distance between feature points in the image, generates a corrected distance in which a deviation between the estimated distance and a focal distance to the subject has been corrected on the basis of the difference distance information. The biometric authentication device generates information for controlling a focal point during image acquisition of the subject on the basis of the corrected distance, and generates information for selecting an image to be biometrically authenticated from among images of the subject photographed after controlling the focal point.

19 Claims, 11 Drawing Sheets

(56) References Cited

U.S. PATENT DOCUMENTS

| | | | |
|---|---|---|---|
| 2012/0242886 A1* | 9/2012 | Kawarada | G02B 7/365 |
| | | | 348/E5.045 |
| 2015/0124157 A1* | 5/2015 | Hongu | H04N 23/672 |
| | | | 348/353 |
| 2019/0065845 A1* | 2/2019 | Xu | H04N 23/45 |
| 2019/0297267 A1 | 9/2019 | Inoue | |

FOREIGN PATENT DOCUMENTS

| | | |
|---|---|---|
| JP | 2007-094535 A | 4/2007 |
| JP | 2007-159762 A | 6/2007 |
| JP | 2016-135640 A | 7/2016 |
| JP | 2019-168479 A | 10/2019 |
| WO | 2018/220963 A1 | 12/2018 |

OTHER PUBLICATIONS

JP Office Communication for JP Application No. 2023-100888, mailed on Jan. 16, 2024 with English Translation.

\* cited by examiner

BIOMETRIC AUTHENTICATION DEVICE, BIOMETRIC AUTHENTICATION METHOD, AND BIOMETRIC AUTHENTICATION PROGRAM

This application is a National Stage Entry of PCT/JP2020/007076 filed on Feb. 21, 2020, the contents of all of which are incorporated herein by reference, in their entirety.

TECHNICAL FIELD

This disclosure relates to a biometric authentication device, a biometric authentication method, and a biometric authentication program.

BACKGROUND ART

Many methods for recognizing a person by using their face or a part thereof such as an iris have been proposed. In these methods, the face or a part thereof is imaged with a camera, information that can identify an individual is extracted, and matching of the individual is performed. At this time, in order to perform highly accurate authentication, it is necessary to obtain a high-quality image.

Patent Document 1 describes an authentication method using the distance from the sensor to each feature point such as the forehead of the face and the tip of the nose. Patent Document 2 discloses an authentication system that adjusts an imaging device using a distance sensor. Patent Document 3 discloses a control device capable of high-precision and high-speed focus control even in a state where image deviation has occurred due to displacement or deformation of the optical system by obtaining distance information corrected for errors such as parallax amount calculated from two images obtained from the main imaging unit and the sub-imaging unit.

CITATION LIST

Patent Literature

[Patent Document 1] Japanese Unexamined Patent Application Publication No. 2006-221422
[Patent Document 2] Japanese Unexamined Patent Application Publication No. 2007-094535
[Patent Document 3] Japanese Unexamined Patent Application Publication No. 2019-168479

SUMMARY

Problems to be Solved

An example of object of this disclosure is to provide a biometric authentication device, a biometric authentication method, and a biometric authentication program that improve the aforementioned related techniques.

Means for Solving the Problems

The biometric authentication device according to one aspect of the present disclosure is provided with a correction means that, by utilizing difference distance information obtained on the basis of in-focus information indicating the degree of focusing in an image of a subject serving as the target of biometric authentication and an estimated distance to the subject obtained from the distance between feature points in the image, the difference distance information indicating a deviation between the estimated distance and a focal distance to the subject, generates a corrected distance in which the deviation between the estimated distance and the focal distance to the subject has been corrected on the basis of the difference distance information; a focal point control means that generates information for controlling a focal point during image acquisition of the subject on the basis of the corrected distance; and an in-focus determination means that generates information for selecting an image to be biometrically authenticated from among images of the subject photographed after controlling the focal point.

A computer-based biometric authentication method according to one aspect of the present disclosure, by utilizing difference distance information obtained on the basis of in-focus information, which indicates the degree of focusing in an image of a subject serving as the target of biometric authentication, and an estimated distance to the subject, which is obtained from the distance between feature points in the image, the difference distance information indicating a deviation between the estimated distance and a focal distance to the subject, generates a corrected distance in which the deviation between the estimated distance and the focal distance to the subject has been corrected on the basis of the difference distance information; generates information for controlling a focal point during image acquisition of the subject on the basis of the corrected distance; and generates information for selecting an image to be biometrically authenticated from among images of the subject photographed after controlling the focal point.

A recording medium according to one aspect of the present disclosure records a program that causes a computer to function as a correction means that, by utilizing difference distance information obtained on the basis of in-focus information indicating the degree of focusing in an image of a subject serving as the target of biometric authentication and an estimated distance to the subject obtained from the distance between feature points in the image, the difference distance information indicating a deviation between the estimated distance and a focal distance to the subject, generates a corrected distance in which the deviation between the estimated distance and the focal distance to the subject has been corrected on the basis of the difference distance information; a focal point control means that generates information for controlling a focal point during image acquisition of the subject on the basis of the corrected distance; and an in-focus determination means that generates information for selecting an image to be biometrically authenticated from among images of the subject photographed after controlling the focal point.

EXAMPLE EMBODIMENT

Hereinbelow, a biometric authentication device according to embodiments of the present disclosure will be described with reference to the drawings.

First Embodiment

Figure 1:
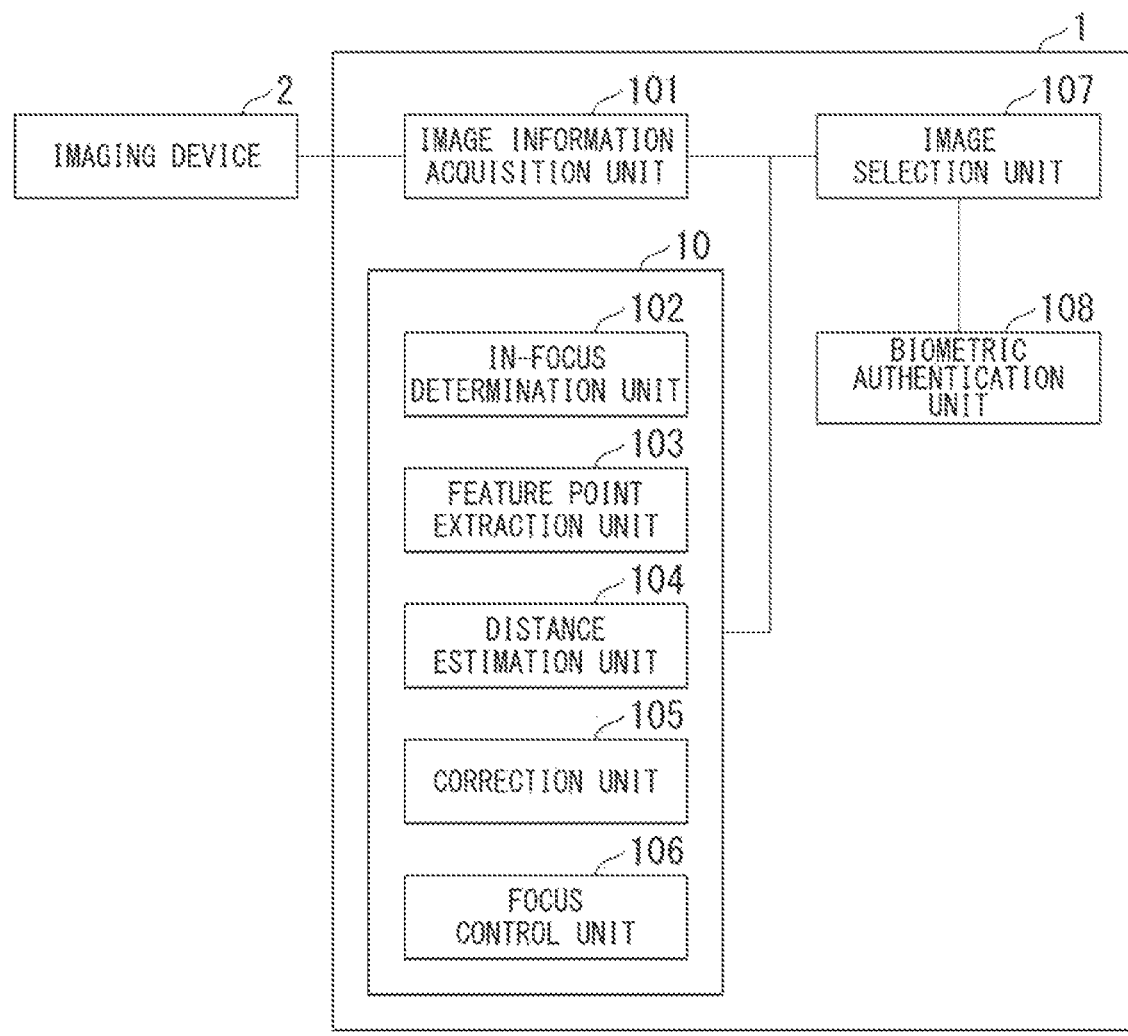
FIG. 1 is a function block diagram in the first embodiment of a biometric authentication device.

FIG. 1 is a diagram showing a configuration of a biometric authentication device 1 according to the first embodiment. In FIG. 1, reference numeral 1 denotes a biometric authentication device, and reference numeral 2 denotes an imaging device. The biometric authentication device 1 acquires an image from the video captured by the imaging device 2 and performs biometric authentication using the obtained image. The imaging device 2 is a device capable of taking an image of a subject including a biometric body portion subject to biometric authentication. Although the imaging device 2 is shown in FIG. 1 as a device different from the biometric authentication device 1, the imaging device 2 may be a portion of the biometric authentication device 1.

The biometric authentication device 1 is provided with an image information acquisition unit 101, an adjustment unit 10, an image selection unit 107, and a biometric authentication unit 108.

The image information acquisition unit 101 acquires an image from a video obtained by controlling the imaging device 2. The image information acquisition unit 101 outputs the obtained image information to the adjustment unit 10 and the image selection unit 107. The image information acquisition unit 101 also controls a focal point of the imaging device 2 by using information related to focal point control from the adjustment unit 10, and acquires a new image.

The adjustment unit 10 determines the degree to which the image obtained by the image information acquisition unit 101 is in focus, finds the estimated distance to the subject using the distance between feature points appearing in the image, and finds the difference distance that indicates the deviation between the estimated distance that was found and the focal distance to the subject. The adjustment unit 10 generates a corrected distance obtained by correcting the deviation of the estimated distance that was found on the basis of the difference distance information, and generates information for controlling the focal point at the time of image acquisition of the subject based on the corrected distance. The adjustment unit 10 outputs information for controlling the focal point to the image information acquisition unit 101.

Among the image information output from the image information acquisition unit 101, the image selection unit 107 outputs an image for biometric authentication in which the image is in focus, to the biometric authentication unit 108 as a selected image.

The biometric authentication unit 108 performs biometric authentication processing on the selected image output from the image selection unit 107, and generates an authentication result.

Next, the adjustment unit 10 will be described. The adjustment unit 10 includes an in-focus determination unit 102, a feature point extraction unit 103, a distance estimation unit 104, a correction unit 105, and a focal point control unit 106.

The in-focus determination unit 102 analyzes image information output from the image information acquisition unit 101 to determine whether the image is in focus, and outputs in-focus information indicating whether the image is in focus to the correction unit 105. Further, the in-focus determination unit 102 generates selection information which is information for specifying the image or frame in focus from the determination result of whether or not the image is in focus, and outputs the selection information to the image selection unit 107.

The feature point extraction unit 103 detects feature points, which are facial landmarks, on the basis of the image information output from the image information acquisition unit 101, and outputs the position information of the facial landmarks to the distance estimation unit 104.

The distance estimation unit 104 estimates the distance to the subject on the basis of the distance between the landmark positions based on the landmark position information output from the feature point extraction unit 103, and outputs the estimated distance information to the correction unit 105.

The correction unit 105 corrects the distance to the subject on the basis of the estimated distance information output from the distance estimation unit 104 and the in-focus information output from the in-focus determination unit 102, and outputs the corrected distance information that is obtained to the focal point control unit 106.

The focal point control unit 106 generates control information for controlling the focal point of the lens based on the corrected distance information output from the focal point control unit 106, and outputs the control information to the image information acquisition unit 101.

Figure 2:
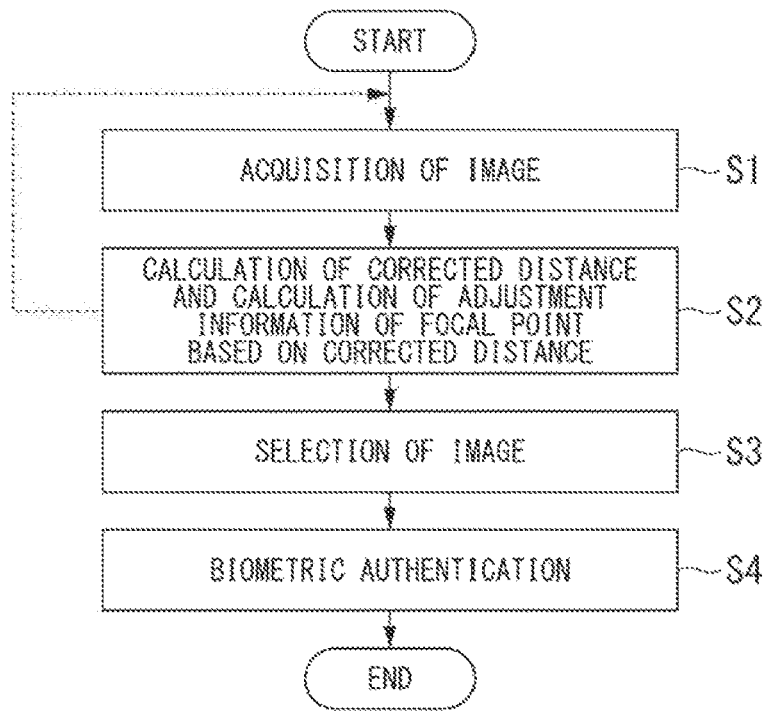
FIG. 2 is a flowchart showing the operation of the biometric authentication device.

Next, the operation of the biometric authentication device 1 shown in FIG. 1 will be described with reference to FIG. 2. First, as biometric authentication, biometric authentication using all or part of the face or head is targeted. For example, face recognition, iris recognition, recognition in the area around the eyes, ear recognition, etc. is included in the target.

The image information acquisition unit 101 controls the imaging device 2 to capture a video of a person as a subject and acquire an image (Step S1). Here, the imaging device 2 may be anything as long as the above-mentioned part used for biometric authentication can be imaged with a resolution and image quality capable of authentication. For example, it may be a USB camera, an IP camera, a Web camera, or a CCTV camera. However, when performing biometric authentication using near-infrared light (iris recognition, etc.), the camera must be able to capture video in the near-infrared region with the resolution and image quality required for biometric authentication.

The imaging device 2 has a mechanism for adjusting the focus according to the distance to the subject. As this mechanism, any mechanism conventionally used in autofocus can be used. In addition, new devices that have come into use in recent years, such as liquid lenses, may be used.

The imaging device 2 is at least capable of controlling the focal point from the outside, and is a device capable of controlling the focal point according to the control information input from the focal point control unit 106. As an example of focal point control, the rotation angle of the focus ring that adjusts the distance of the lens or the rotation angle of the focus motor used to rotate the focus ring is included in the control information. Further, in the case of a liquid lens, the control information includes the control voltage information of the liquid lens, the control voltage is changed to a specified value, and an image is acquired.

The image acquired by the image information acquisition unit 101 is output to the adjustment unit 10 and the image selection unit 107. Further, in the adjustment unit 10, processing is performed using the images acquired by the in-focus determination unit 102 and the feature point extraction unit 103.

The adjustment unit 10 utilizes the image acquired by the image information acquisition unit 101 to generate information for controlling the focal point of the subject at the time of image acquisition (Step S2). More specifically, the adjustment unit 10 determines the degree to which the image obtained by the image information acquisition unit 101 is in focus, finds the estimated distance to the subject obtained on the basis of the distance between the feature points of the image, and finds the difference distance information indicating the deviation between the estimated distance that was found and the focal distance to the subject. Further, the adjustment unit 10 generates a corrected distance obtained by correcting the deviation of the estimated distance that was found on the basis of the difference distance information, and generates information for controlling a focal point during image acquisition of the subject on the basis of the corrected distance.

The focus adjustment process at the time of image acquisition of the subject by the adjustment unit 10 is performed until the image comes into focus to the extent that biometric authentication can be performed with a predetermined accuracy. Alternatively, the focus adjustment process at the time of image acquisition of the subject by the adjustment unit 10 is performed a predetermined number of times. During that time, the feedback processing of Step S1 and Step S2 is repeated, and then the process proceeds to Step S3.

The image selection unit 107 stores images that have been input for a certain period of time. Then, the image selection unit 107 selects and outputs an image based on the selection information indicating that the image is in focus, which is output from the in-focus determination unit 102 of the adjustment unit 10 (Step S3). Here, the "image" is a predetermined frame in a video obtained by the imaging device 2, or a still image acquired from a predetermined frame. The selection information is information for identifying an image that is in focus, and is information such as a frame number or a time stamp of the in-focus image. The image selected by the selection information is output to the biometric authentication unit 108 as a selected image.

The number of images to be selected may not be limited to one, but rather may be a plurality of images. For example, the frames before and after the frame having the highest in-focus index may be selected. Thereby, even if the position in focus is not the part used for biometric authentication, but a slightly offset position, the possibility of acquiring an image in which the part required for biometric authentication is in focus is increased, and the probability of failure in biometric authentication can be reduced.

The biometric authentication unit 108 performs biometric authentication processing on the selected image output from the image selection unit 107, and generates an authentication result (Step S4). More specifically, the biometric authentication unit 108 extracts a feature corresponding to the biometric authentication used from the image that is input. Then, the feature is compared with the feature of the person registered in advance, and it is determined who the target of the biometric authentication is or whether the person does not match with anyone. For example, in the case of iris recognition, the eye area is cropped from the selected image and the feature of the iris is extracted. Then, the extracted feature and the feature of the pre-registered iris are compared, and the authentication result is generated.

Figure 3:
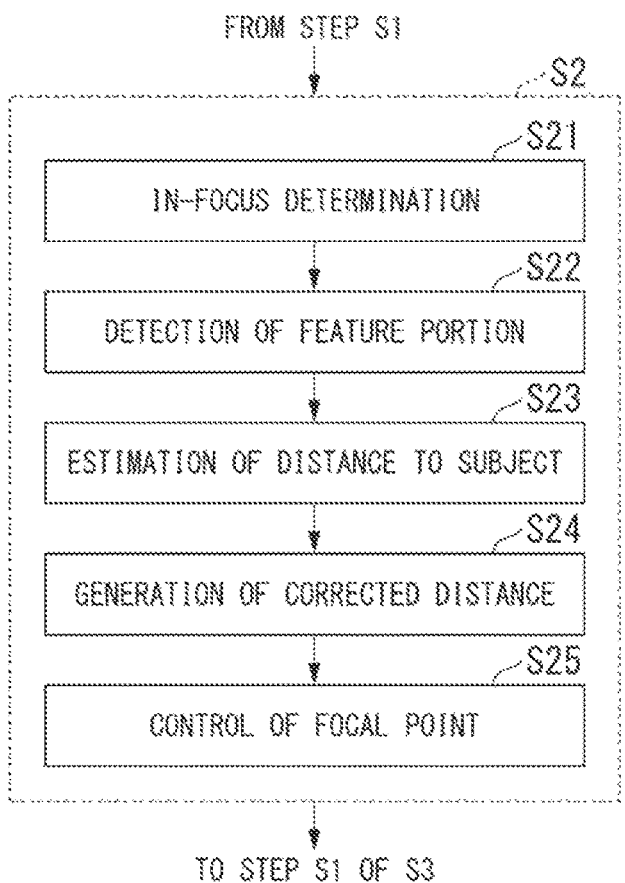
FIG. 3 is a flowchart showing the operation of the adjustment unit in the first embodiment.

Hereinbelow, the operation of the adjustment unit 10 of the biometric authentication device 1 (Step S2 in FIG. 2) will be described in detail with reference to FIG. 3. In the description of the operation of the adjustment unit 10 of the biometric authentication device 1, first, the operation of the adjustment unit 10 when the person of the subject who is the target of biometric authentication is stopped is described, and then the operation of the adjustment unit 10 when the person moves is described.

(Operation When the Person Who is the Subject is Stopped)

The in-focus determination unit 102 analyzes the image information output from the image information acquisition unit 101, and performs an in-focus determination, which is a determination of whether or not the subject is in focus (Step S21). In the in-focus determination, an in-focus index indicating whether or not the image is in focus in a predetermined area is calculated. The in-focus index is an index that becomes higher as the image is more in focus, and, for example, is a value that evaluates how much the power of a high-frequency component or edge component of an image is there.

There are various methods for determining whether or not the subject is in focus using an in-focus index. For example, it may be determined that the subject is in focus when the in-focus index exceeds a predetermined threshold value, or in-focus determination may be performed by taking pictures while shifting the focal point position by focal point control, finding the in-focus index, and then finding the point at which the index becomes a maximum. In the latter case, it is not immediately possible to know whether or not the image is in focus on the spot, and so after taking pictures with the focal position moved several times, the image in focus will be known. Therefore, it is necessary to temporarily hold an image that may be selected as an image that is in focus by the image selection unit 107 described later.

The in-focus determination unit 102 generates and outputs in-focus information on the basis of the result of the in-focus determination. The in-focus information is information indicating whether or not the target image is in focus. This may be binary information indicating whether or not the image has become in focus, or may be a continuous value indicating the degree of focus. When a continuous value, for example, the above-mentioned in-focus score value may be used as it is. In the case of a method in which the focal point is altered several times to obtain a maximum value, in addition to information on whether the image is in focus, an index (frame number, timestamp, etc.) for identifying the image in which the in-focus index is a maximum among the altered focal points is included. This in-focus information is information indicating the degree of focusing.

The obtained in-focus information is input to the correction unit 105. The information indicating which frame is in focus or the information indicating the degree of focusing is output to the image selection unit 107 as selection information.

The feature point extraction unit 103 performs face detection or head detection on the input image, and obtains a facial landmark which is a position of a characteristic portion included in the face or the head (Step S22). In the following, the facial landmark may also be simply referred to as a landmark or a feature point.

It should be noted that the detection of the face or the head itself or a portion thereof can be performed by using a detector trained in the feature points of the face or the head or portions thereof. For example, a detector is used that extracts a histogram of oriented gradients (HOG) feature, which is one of the methods of extracting features from an image, and performs detection based on the extracted feature. Further, as another example, a detector may be used that directly detects from an image using convolutional neural networks (CNNs), which are a kind of image recognition by machine learning.

Among these landmarks, the feature point extraction unit 103 may obtain the position information (position coordinates on the image) of only the feature points used for estimating the distance to the subject in the distance estimation unit 104. For example, when estimating the distance to the subject based on the interocular distance, which is the distance between the pupils of both eyes, the pupils of both eyes are set as feature points and the positions thereof are found. Alternatively, instead of the positions of the pupils, the positions of other feature points of the eye (medial ocular angle, lateral ocular angle, etc.) may be obtained, and the distance between these feature points may be used instead of the interocular distance. Alternatively, the distance between other feature points such as the nose and mouth may be used instead of the eyes, in which case the positions of the feature points should be obtained. The obtained landmark position information is output to the distance estimation unit 104.

The distance estimation unit 104 estimates the distance to the subject on the basis of the position information of the obtained landmarks (Step S23). Assuming that individual differences in the size of a person's face are not large, the distance from the subject to the face can be roughly estimated from the distance between the positions of the feature points. Although various feature points can be used as described above, in the following, an example is described of using the pupils of both eyes as feature points, and finding the distance to the subject using the interocular distance, which is the distance between the pupils.

In this case, the distance estimation unit 104 may obtain a relational expression between the interocular distance and the distance from the camera to the subject in advance, and obtain the distance to the subject based on the expression. That is, if the interocular distance is d and the estimated distance to the subject is $D_E$, the relational expression can be expressed as Equation 1.

$$D_E = f(d) \quad \text{[Equation 1]}$$

This function f(d) is found in advance and then used. For example, the function f(d) may be approximated by a straight line obtained by linear regression, or may be obtained by applying a polynomial or other mathematical formula. Alternatively, the function f(d) may be expressed by combining approximations for each section. The estimated distance to the subject obtained in this way is output to the correction unit 105 as the estimated distance information.

The correction unit 105 generates information on the corrected distance for correcting the distance to the subject, based on the estimated distance information and in-focus information (Step S24). The processing of the correction unit 105 will be described in detail separately.

The focal point control unit 106 generates control information for controlling the focal point of the imaging device 2 based on the corrected distance information (Step S25). As described above, this control information is generated according to the method of focusing by the imaging device 2. Further, the focal point control unit 106 outputs the generated control information to the image information acquisition unit 101. The image information acquisition unit 101 controls the focal point of the imaging device 2 using the obtained control information, and obtains a new image having a different focal point from the video for which focal point control was performed.

Next, the operation of the correction unit 105 will be described in detail. The correction unit 105 generates information on the corrected distance for correcting the distance to the subject based on the estimated distance information and the in-focus information.

In generating information on the corrected distance, the correction unit 105 may use the estimated distance input in the past and the corresponding corrected distance and in-focus information instead of the estimated distance and in-focus information at the current time. Therefore, it is assumed that the correction unit 105 holds, in association with the time, the estimated distance input within a certain time in the past and the result of the corrected distance that was output.

The method of correcting the distance based on the estimated distance $D_E$ and obtaining the corrected distance $D_C$ is arbitrary. Hereinbelow, a case where the corrected distance $D_C$ is obtained by adding the difference distance $\Delta D$ to the estimated distance $D_E$ will be described. It should be noted that the correction method is not limited to the method described below.

The operation of the correction unit 105 is roughly classified into an in-focus distance search mode and a focusing tracking mode. The in-focus distance search mode is a mode for finding the in-focus difference distance $\Delta D_f$ when the in-focus difference distance $\Delta D_f$ corresponding to the in-focus state has not been obtained. The in-focus tracking mode is a mode in which, after the in-focus difference distance $\Delta D_f$ is obtained, the distance is corrected using that value and the in-focus state is maintained. Hereinbelow, the operation of the correction unit 105 in each mode will be described.

(In-Focus Distance Search Mode)

In the initial state, since the in-focus difference distance $\Delta D_f$ is indefinite, it is operated in the in-focus distance search mode. In this mode, the corrected distance $D_C$ is obtained from the estimated distance $D_E$ according to a certain rule. Here, assuming that the variation from the initial estimated distance (estimated distance at time $t_0$) at time $t_n$ is $g_1(t_n)$, the corrected distance Dc can be expressed as Equation 2. Here, $g_1$ represents the variation obtained in the in-focus distance search mode.

$$D_C(t_n) = D_E(t_0) + g_1(t_n) \quad \text{[Equation 2]}$$

As $g_1(t_n)$ of Equation 2, for example, a function that changes by the distance $\delta_1$ (>0) as in Equation 3 can be used. Also, n indicates the number of times the processing shown in FIG. 3 was performed from the time $t_0$ at which the initial estimated distance was found, while $t_n$ indicates the time at the nth time.

$$g_1(t_n) = (n - N_1)\delta_1 \quad \text{[Equation 3]}$$

In Equation 3, $N_1$ is a value that determines as an index the average number of continuations until the in-focus information that is input indicates the image becoming in focus in the in-focus distance search mode. Preferably, the value is smaller than the average number of continuations of the number of repetitions until the in-focus information indicates the image becoming in focus, for example, a value of about half of the average number of continuations. This makes it possible to generate a distance around the estimated distance $D_E$ as the corrected distance.

Such calculation continues until the in-focus information that is input indicates the image becoming in focus.

However, if the estimated distance deviates significantly from the initial value, the above processing may be repeated based on the estimated value. For example, if the estimated distance $D_E(t_j)$ at time $t_j$ has changed by a certain percentage or more from the initial estimated distance $D_E(t_0)$, the search is restarted based on the estimated distance $D_E(t_j)$ at time $t_j$.

When the in-focus information obtained by the in-focus determination unit 102 indicates the image becoming in focus, the difference distance $\Delta_D$ at that time is obtained as the in-focus difference distance $\Delta D_f$. When the current time is $t_n$ and the in-focus information indicates that the image at time $t_i$ (i<n) is in focus, the difference between the corrected distance and the estimated distance at time $t_i$ is the variation in distance based on individual differences and the like. Therefore, the value obtained by subtracting the estimated distance from the corrected distance shown in Equation 4 is found as the in-focus difference distance $\Delta D_f$, and is stored as difference distance information for that target person.

$$\Delta D_f = D_C(t_i) - D_E(t_i) \quad \text{[Equation 4]}$$

(In-Focus Tracking Mode)

The in-focus tracking mode will now be described. After the difference distance information is found by the in-focus distance search mode, the corrected distance is calculated by adding the in-focus difference distance $\Delta D_f$ to the estimated distance information, as shown in Equation 5 (in-focus tracking mode).

$$D_C(t_n) = D_E(t_n) + \Delta D_f \quad \text{[Equation 5]}$$

Alternatively, the above-mentioned in-focus difference distance may depend on the estimated distance $D_E$. Therefore, as shown in Equation 6, the in-focus difference distance $\Delta D_f$ is treated as a function of the estimated distance $D_E$, and each time the image becomes in focus, the set of the difference distance and the estimated distance at the time of being in focus is stored, whereby this function may be obtained.

$$D_C(t_n) = D_E(t_n) + \Delta D_f(D_E(t_n)) \quad \text{[Equation 6]}$$

In this case, the difference distance information is information that describes a function for finding the in-focus difference distance $\Delta D_f$ from the estimated distance $D_E$. At first, it is controlled as constant regardless of the estimated distance $D_E$, and if the image cannot be in focus when $D_E$ changes, the in-focus difference distance is found by adjusting the focal position with a slight alteration as described later. This is associated with $D_E$ and stored for use. At this time, fitting may be performed by a regression line and the coefficient may be held as the difference distance information.

If the in-focus information obtained as a result of the control with the corrected distance found in this way indicates insufficient focus, the distance is further altered slightly around that. For example, it is conceivable to control according to Equation 7 by using the function $g_2(t)$ whose range is narrower than that of $g_1(t)$. Here, $g_2$ represents the fluctuation amount obtained in the in-focus tracking mode.

$$D_C(t_n) = D_E(t_n) + \Delta D_f + g_2(t_n) \quad \text{[Equation 7]}$$

As the function $g_2(t)$, for example, $0 < |\delta_2| < |\delta_1|$ and $0 < N_2 < N_1$ may be set, and a function such as Equation 8 or Equation 9 may be used.

$$g_2(t_n) = [\{n \bmod (2N_2+1)\} - N_2]\delta_2 \quad \text{[Equation 8]}$$

$$g_2(t_n) = [|(n \bmod 4N_2) - 2N_2| - N_2]\delta_2 \quad \text{[Equation 9]}$$

This makes it possible to obtain a more accurate corrected distance $D_C(t_n)$ by making fine adjustments in the front/rear distance with respect to the corrected distance $D_C$ obtained with the estimated distance $D_E$ and $\Delta D_f$. Then, the values of $D_E(t_n)$ and $\Delta D_f + g_2(t_n)$ at the time of the image becoming in focus are associated and stored, and used in the subsequent calculation of the difference distance.

Figure 4:
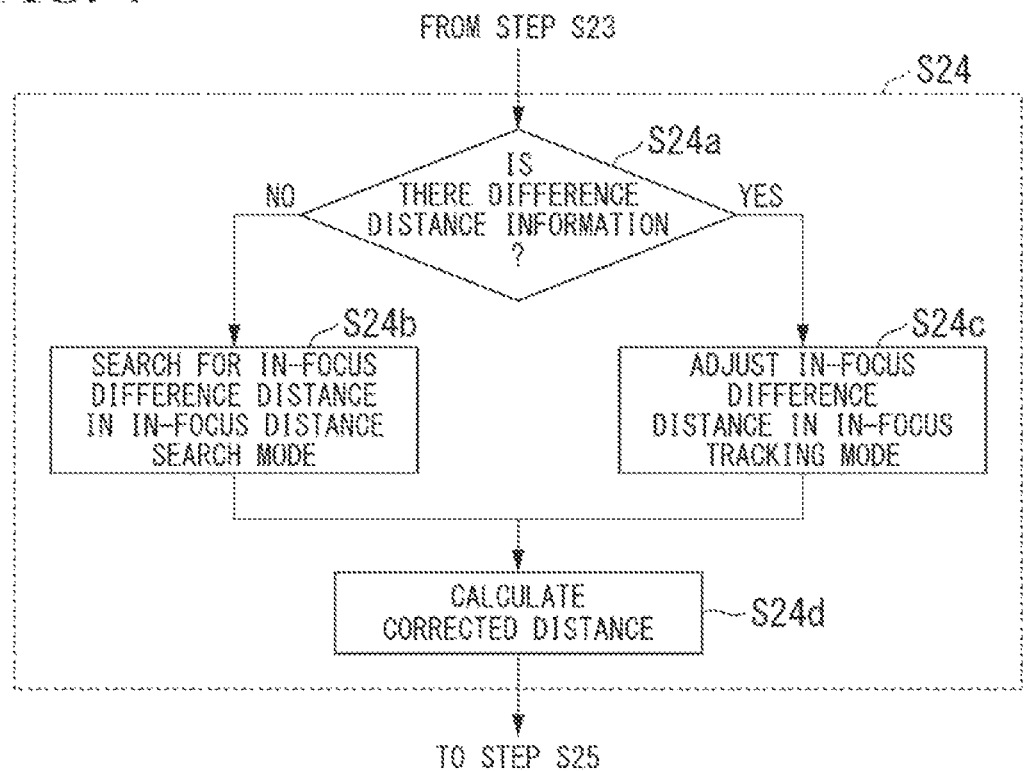
FIG. 4 is a flowchart showing the operation of the correction unit.

Next, the operation of the correction unit 105 described above will be described with reference to a flowchart. FIG. 4 is a flowchart showing the processing flow of the correction unit 105.

The correction unit 105 checks whether or not there is difference distance information (whether or not it has already been calculated) (Step S24a). When the difference distance information has not been obtained yet (Step S24a: No), the correction unit 105 calculates the in-focus difference distance in the in-focus distance search mode (Step S24b).

When the difference distance information has already been obtained (Step S24a: Yes), the correction unit 105 adjusts the in-focus difference distance in the in-focus tracking mode (Step S24c). Then, the correction unit 105 calculates the correction distance on the basis of the obtained in-focus difference distance (Step S24d).

The above process is repeated until an image is obtained in which the image becomes in focus to the extent that sufficient accuracy can be obtained in biometric authentication, or a predetermined number of times. The corrected distance information obtained in this way is output to the focal point control unit 106.

(Operation When Person Who is the Subject Moves)

Next, the operation of the biometric authentication device 1 when the person who is the subject is not stationary at a fixed place but rather moves will be described. For example, when the person as a subject performs authentication while walking at a gate, the distance between the person and the imaging device 2 changes as the person moves. Therefore, biometric authentication is performed by changing the position of the focal point according to the movement of the person. Hereinbelow, a case where a person performs authentication while moving toward the imaging device 2 will be described. It should be noted that this disclosure is not limited to the case where the person moves toward the imaging device 2, and is similarly applicable to any case where the movement of the person can be predicted.

When a person who is the subject moves toward the imaging device 2, the distance to the subject (hereinbelow also simply referred to as the subject distance) decreases with the passage of time. Therefore, if the focus is set to a distance shorter than the current subject distance, the subject distance becomes the set distance at a point in time a little ahead, and an in-focus image can be acquired. Then, after the in-focus image is acquired, the focus is set to become in focus at an expected subject distance at a point in time a little ahead so that an in-focus image can be acquired at a time a little further ahead. That is, the corrected distance is calculated so that the in-focus image can be acquired at a time ahead. More specifically, for example, when a person is moving, the corrected distance is calculated using information that is the basis of the prediction for acquiring the in-focus image, such as the walking speed of the person or predicted movement distance of the person until the next new image is acquired, so that an in-focus image can be acquired at a future time at which the next image is acquired.

Then, after acquiring the in-focus image, the same procedure is repeated. This makes it possible to acquire in-focus images at a plurality of positions and perform biometric authentication. Hereinbelow, the operation of the correction unit 105 that realizes this will be described.

(In-Focus Distance Search Mode)

In the correction unit 105, the in-focus difference distance $\Delta D_f$ is not obtained in the in-focus distance search mode. Therefore, the corrected distance $D_C(t_n)$ is calculated by Equation 10, where L is a value slightly larger than the maximum value of $|\Delta D_f|$ that can occur due to individual differences.

$$D_C(t_n)=D_E(t_0)-L \qquad \text{[Equation 10]}$$

This fixed value is output as a corrected value until the in-focus information indicates that the image has become in focus. When the in-focus information has indicated that the image becomes in focus, the in-focus difference distance $\Delta D_f$ is found by Equation 4 in the same manner as described above.

(In-Focus Tracking Mode)

In the in-focus tracking mode, the subject distance at a point in time a little ahead is predicted, and the corrected distance $D_C$ is set so that the subject is in focus at that point in time. Letting the time at which the image is in focus be $t_i$, the elapsed time from the time $t_i$ of the scheduled time to next acquire the in-focus image (this is $t_m$) is found, the distance that can be moved during that time is found, and a distance slightly larger than that distance is found as $L_M$. Then, the corrected distance $D_C$ is calculated by Equation 11.

$$D_C(t_n)=D_E(t_i)+\Delta D_f-L_M \qquad \text{[Equation 11]}$$

Here, assuming that the walking speed of the person is V and the margin is $\delta_3$ (>0), $L_M$ is represented by Equation 12.

$$L_M=V(t_m-t_i)+\delta_3 \qquad \text{[Equation 12]}$$

As the walking speed V of the person, an average value may be used, or the walking speed V may be estimated and used from the time variation of the interocular distance d. That is, the walking speed V may be estimated and used by using the calculation history of the estimated distance $D_E$ at a time earlier than this.

The corrected distance $D_C$ obtained in this way has the subject distance at this value, and the in-focus information by the in-focus determination unit 102 is output until indicating that the image has become in focus. After the image is in focus, $L_M$ is obtained again, and the corrected distance $D_C$ is calculated, in the same manner as described above. At this time, the in-focus difference distance $\Delta D_f$ may also be calculated and updated. The value obtained at a close position is generally more accurate than the in-focus difference distance obtained at a position far away from the subject because the accuracy of the relative position between the face landmarks is improved. Therefore, by appropriately updating the in-focus difference distance $\Delta D_f$, the estimation accuracy of the in-focus position is improved, the number of times that biometric authentication can be executed increases, and the failure rate of biometric authentication can be reduced.

Operations other than the correction unit 105 are the same as when the person is stopped. However, searches in the in-focus distance search mode by the correction unit 105 can be performed even before the person approaches a distance suitable for biometric authentication. As a result, when a person approaches a position suitable for biometric authentication, the mode shifts to the in-focus tracking mode, so that faster authentication becomes possible.

In this way, when calculating the distance from the position of the part that becomes a facial landmark to the person, by controlling the focal point in consideration of individual differences, high-speed focusing becomes possible, and it will be possible to execute multiple biometric authentications at a higher speed. Therefore, even if the acquisition of the biometric authentication image fails once, recovery is possible in the subsequent image acquisition, and so biometric authentication can be performed more reliably.

Second Embodiment

Figure 5:
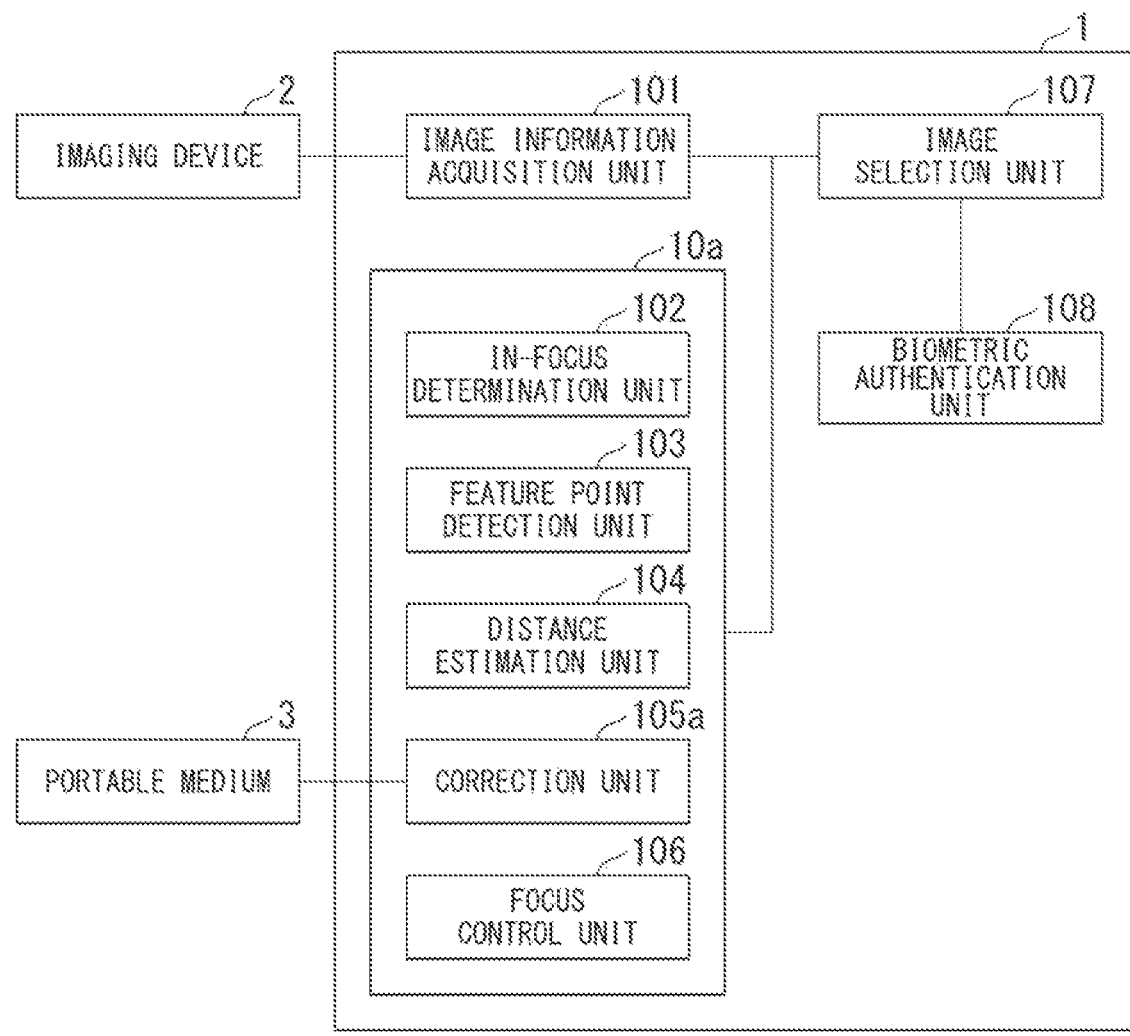
FIG. 5 is a function block diagram in the second embodiment of a biometric authentication device.

Next, the biometric authentication device 1 according to the second embodiment will be described. FIG. 5 shows a function block diagram of the biometric authentication device 1 according to the second embodiment. The difference from the function block diagram of the biometric authentication device 1 in the second embodiment shown in FIG. 1 is in the correction unit 105a, with the other processing units being the same. When the correction unit 105a of the biometric authentication device 1 in the second embodiment receives the input of the difference distance information, the correction unit 105a corrects the estimated distance based on the input difference distance information and generates the corrected distance.

Figure 6:
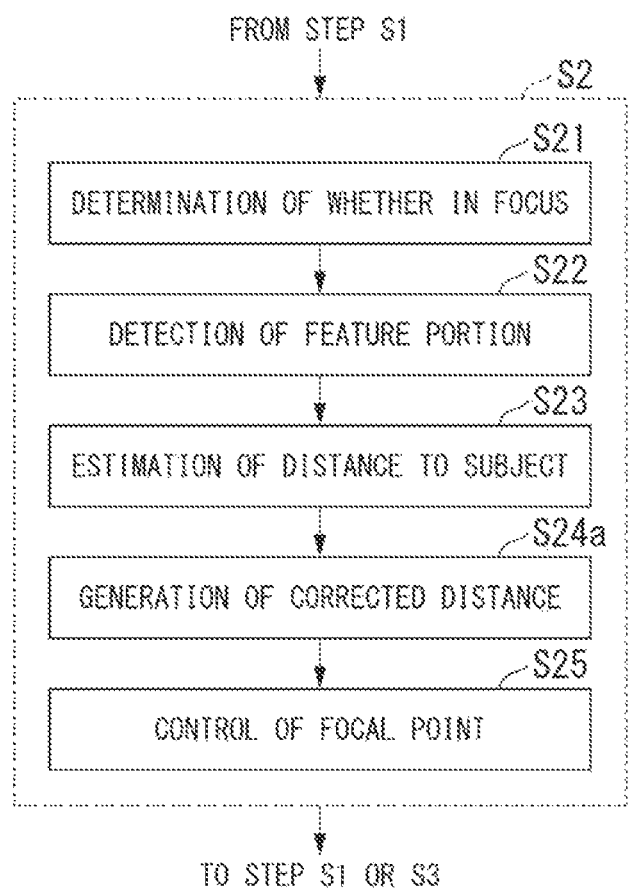
FIG. 6 is a flowchart showing the operation of the adjustment unit according to the second embodiment.

FIG. 6 shows the operation of the adjustment unit 10a of the biometric authentication device 1 in the second embodiment. In FIG. 6, the difference in operation from the adjustment unit 10 of the biometric authentication device 1 in the first embodiment is the operation of the correction unit 105a in Step S24a. Hereinbelow, the operation of the correction unit 105a in Step S24a will be described.

Compared with the operation of the correction unit 105 in the first embodiment, the operation of the correction unit 105a is the same other than receiving input of the difference distance information from a portable medium 3 and generating the corrected distance using the input difference distance information. Here, the difference distance information is basically the same as the difference distance information described in the first embodiment, being information for correcting individual differences. The difference distance information obtained at the time of the previous authentication is stored in the portable medium 3 such as a smartphone, and is read and input by the system at the time of the next authentication.

Alternatively, when registering biometric authentication, if the difference distance information is obtained by the same procedure as at the time of collation, the correction unit 105a may store the difference distance information found at that time for use at the time of collation. Also, instead of storing the difference distance information itself, the interocular distance may be measured or estimated together at the time of registration and stored in the portable medium 3, whereupon the difference distance information may be obtained.

When the difference distance information has been input, the correction unit 105a calculates the corrected distance based on the value. That is, the corrected distance is calculated according to Equation 5 from the beginning. This makes it possible to focus faster than when the difference distance information is unknown, and so the time required for biometric authentication can be shortened.

Third Embodiment

Figure 7:
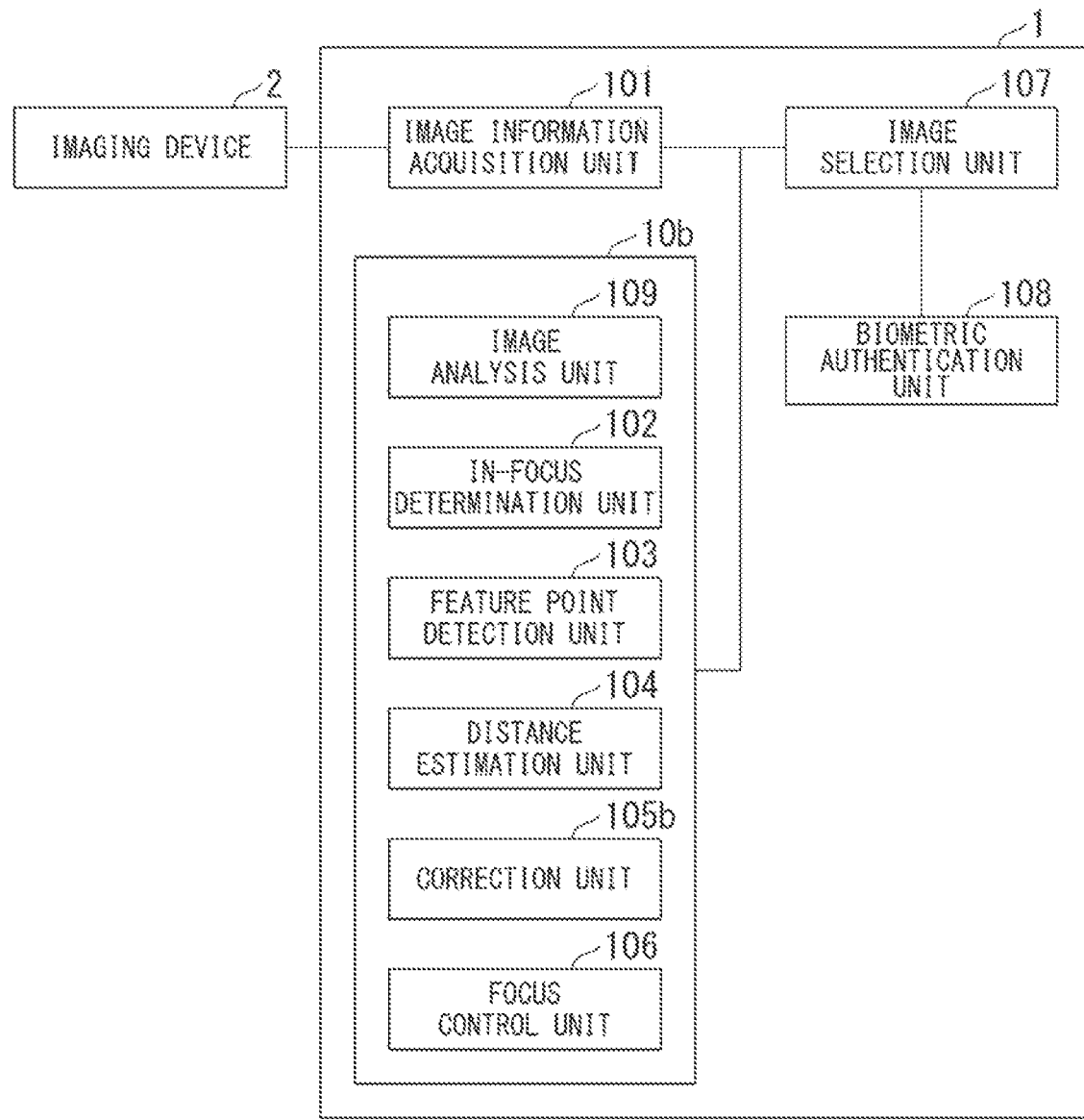
FIG. 7 is a function block diagram of the third embodiment of a biometric authentication device.

Next, the biometric authentication device 1 according to the third embodiment will be described. FIG. 7 shows a function block diagram of the biometric authentication device 1 according to the third embodiment. The differences from the function block diagram of the biometric authentication device 1 in the first embodiment shown in FIG. 1 are in the image analysis unit 109 and the correction unit 105b, with the other processing units being the same.

When the image of the subject is a facial image, the image analysis unit 109 in the third embodiment at least either generates accessory information by detecting an accessory of the face in the subject or calculates information on the orientation of the face. The correction unit 105b changes the method of calculating the corrected distance on the basis of one or both of the accessory information or the face orientation information obtained by the image analysis unit 109.

Figure 8:
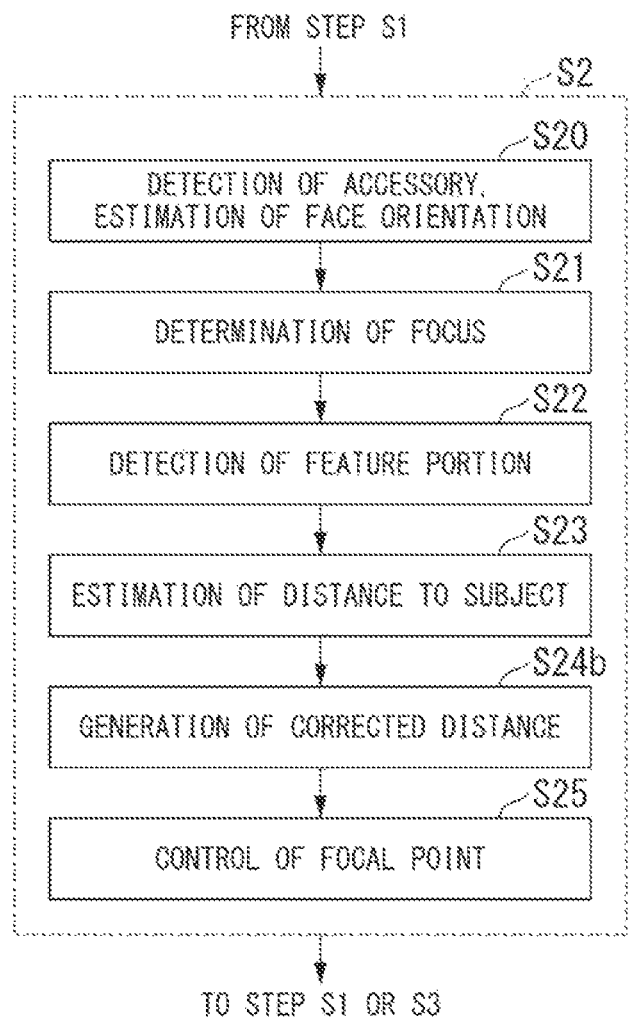
FIG. 8 is a flowchart showing the operation of the adjustment unit according to the third embodiment.

FIG. 8 shows the operation of the adjustment unit 10b of the biometric authentication device 1 in the third embodiment. In FIG. 8, the difference in operation from the adjustment unit 10 of the biometric authentication device 1 in the first embodiment is the operation of the image analysis unit 109 in Step S20 and the correction unit 105b in Step S24b. Hereinbelow, the operations of the image analysis unit 109 and the correction unit 105b will be described.

The image analysis unit 109 detects accessories attached to the face on the basis of the image output from the image information acquisition unit 101, estimates the face orientation, and finds information of the obtained accessory and orientation (Step S20).

That is, the image analysis unit 109 detects whether or not there is an accessory on the face with respect to the input image. Here, the accessory refers to an object attached to the face, and specifically, glasses, sunglasses, an eye patch, goggles, a mask, a niqab, and the like. This detection can be detected by using a detector learned in the same manner as general object detection.

The image analysis unit 109 also calculates the orientation of the face. That is, with respect to a front view, it is calculated how much the direction is deviated in the vertical direction and the horizontal direction. This can also be determined using a determination device trained for each face orientation.

The obtained accessory information and face orientation information are output to the correction unit 105b.

The correction unit 105b finds the corrected distance on the basis of the estimated distance information output from the distance estimation unit 104, the in-focus information output from the in-focus determination unit 102, the accessory information output from the image analysis unit 109, and the face orientation information, and outputs the estimated distance information to the focal point control unit 106 (Step S24b).

That is, the correction unit 105b adjusts the distance correction method on the basis of the accessory/orientation information. When there are no accessories and the face is facing the front, correction is performed in the same manner as in the correction unit 105.

If there is an accessory, the correction unit 105b changes the correction method accordingly. For example, in the case of spectacles, the measured distance between the eyes may deviate from the correct value due to the refraction of the lenses of the spectacles. Therefore, this deviation is also taken into consideration when performing the correction. For example, in the case of spectacles for nearsightedness, the distance between the eyes may be calculated to be smaller than in reality, leading to the possibility of being estimated to be farther than in reality. Therefore, in a situation where there are many people with spectacles for nearsightedness, in consideration of this point, the correction unit 105b may control the range of the corrected distance to be changed in the in-focus distance search mode so as to be biased toward the closer side.

On the other hand, when the face is not facing the front, the distance between the eyes may be corrected in consideration of the direction. For example, when the face is oriented diagonally laterally, the desired interocular distance is shorter than the actual distance. Therefore, the correction unit 105b adds a correction amount due to the inclination to the difference distance to perform the correction. Specifically, when the rotation angle in the lateral direction is θ, the corrected interocular distance d' shown in Equation 13 is used instead of the inter-eye distance d.

$$d' = \frac{d}{\cos \theta} \quad \text{[Equation 13]}$$

The correction unit 105b may be capable of inputting a difference distance in the manner of the correction unit 105a described in the second embodiment. In this case, the correction unit 105b generates the corrected distance using the difference distance information that is input.

In this way, even if an accessory is attached to the face or the orientation is not facing frontward, the image can become in focus at high speed by performing the correction in consideration thereof.

Fourth Embodiment

Figure 9:
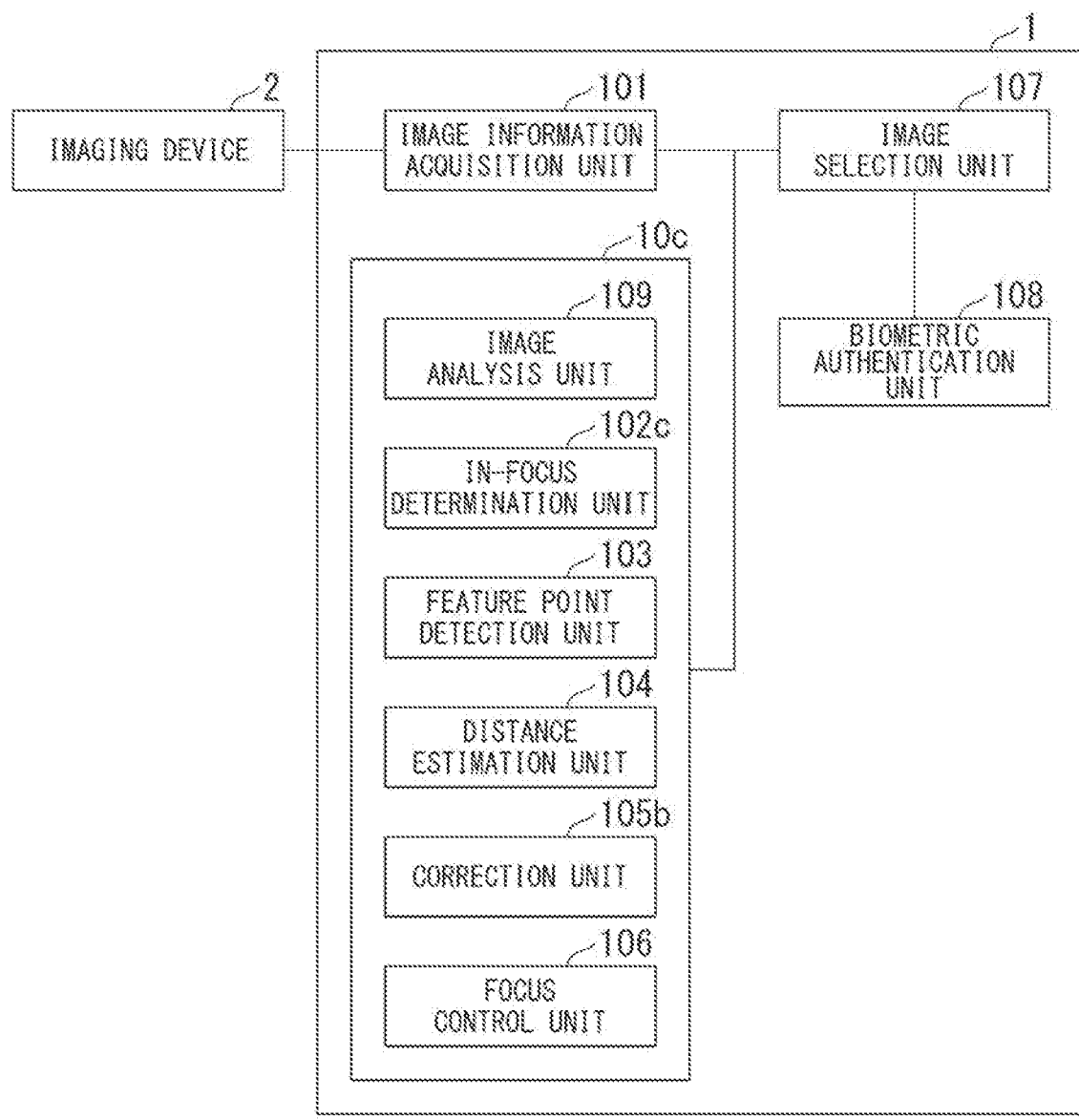
FIG. 9 is a function block diagram of the fourth embodiment of a biometric authentication device.

Next, the biometric authentication device 1 according to the fourth embodiment will be described. FIG. 9 shows a function block diagram of the biometric authentication device 1 according to the fourth embodiment. The difference from the function block diagram of the biometric authentication device 1 in the third embodiment shown in FIG. 7 is that there is an in-focus determination unit 102c, while the other processing units are the same.

The in-focus determination unit 102c in the fourth embodiment changes the selection criteria of the image for biometric authentication from the image of the subject, based on the information about the accessory or the orientation information of the face obtained by the image analysis unit 109.

Figure 10:
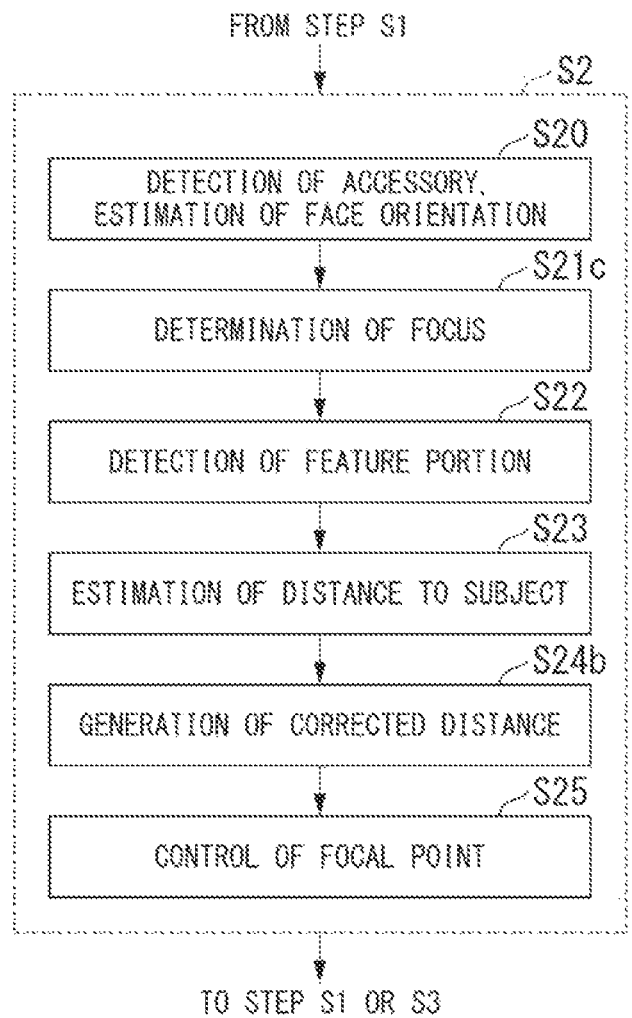
FIG. 10 is a flowchart showing the operation of the adjustment unit according to the fourth embodiment.

FIG. 10 shows the operation of the adjustment unit 10c of the biometric authentication device 1 in the fourth embodiment. In FIG. 10, the difference in operation from the adjustment unit 10b of the biometric authentication device 1 in the third embodiment is the operation of the in-focus determination unit 102c in Step S21c. Hereinbelow, the operations of the image analysis unit 109 and the in-focus determination unit 102c will be described.

The image analysis unit 109 detects an accessory attached to the face from the image output from the image information acquisition unit 101, estimates the face orientation, and finds information relating to the obtained accessory and information on the face orientation (Step S20). The details of the operation of the image analysis unit 109 are as described in the third embodiment.

The in-focus determination unit 102c generates in-focus information and selection information based on an image output from the image information acquisition unit 101, information relating to accessories output from the image analysis unit 109, and the face orientation information. The in-focus information is output to the correction unit 105b, and the selection information is output to the image selection unit 107 (Step S21c).

That is, when the information on accessories and the information on the orientation of the face indicate that there are no accessories on the face and that the face is oriented frontward, the in-focus determination unit 102c performs the same operation as the in-focus determination unit 102.

On the other hand, when there is an indication of an accessory such as spectacles, the in-focus determination unit 102c may change the in-focus determination method or the selection information determination method. For example, when biometric authentication is iris authentication, using the in-focus image as is may lead to the focal point aligning with the frames of the spectacles and the irises not being in focus. Therefore, when spectacles are included in the accessory information, a position shifted slightly further from the position where the in-focus score is maximized may be found as the in-focus position. As the selection information, not only the frame having the maximum in-focus index but also the frame at a position slightly farther from the in-focus position may be selected.

By doing so, it is possible to reduce the risk that the focal point of the acquired image is not aligned with the part required for biometric authentication, and it is possible to reduce the failure rate of biometric authentication when there is an accessory.

In each embodiment, authentication relating to the face, that is, iris authentication and the like, has been described as an example of biometric authentication, but this disclosure is not limited thereto. Application is possible in the case of a method that authenticates using image information of a living body other than the face, and for example, application is also possible to non-contact fingerprint/palm print and vein authentication. In this case, the landmark information represents the feature point of the palm or the finger.

Figure 11:
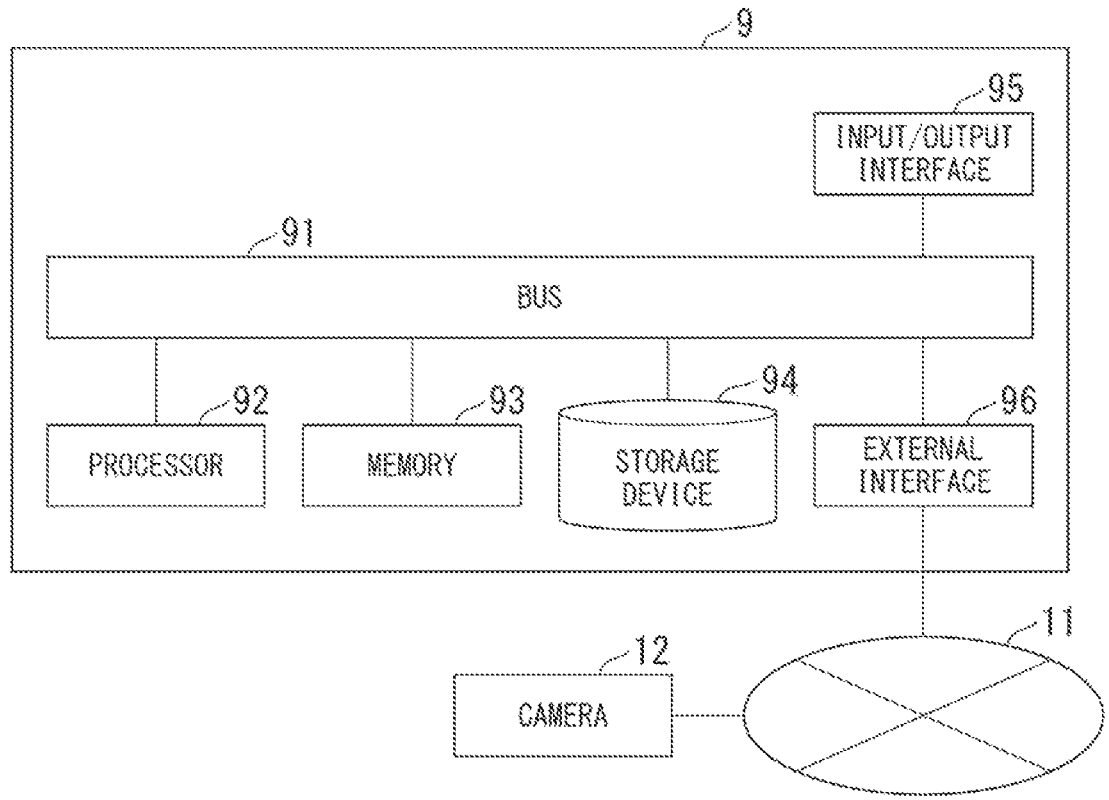
FIG. 11 is a diagram illustrating a hardware configuration of a biometric authentication device.

Next, a configuration example of the hardware in the biometric authentication device 1 will be described. FIG. 11 is a diagram illustrating the hardware configuration of the biometric authentication device. In FIG. 11, in addition to a computing device 9 for realizing the biometric authentication device 1, a network 11 and a camera 12 are illustrated. The computing device 9 is an arbitrary computing device. For example, the computing device 9 is a personal computer (PC), a server machine, a tablet terminal, a smartphone, or the like. The computing device 9 may be a dedicated computer designed to realize the biometric authentication device 1, or may be a general-purpose computer.

The computing device 9 is provided with a bus 91, a processor 92, a memory 93, a storage device 94, an input/output interface 95, and an external interface 96. The bus 91 is a data transmission path for the processor 92, the memory 93, the storage device 94, the input/output interface 95, and the external interface 96, which also serves as a network interface, to transmit and receive data to and from each other. However, the method of connecting the processor 92 and the like to each other is not limited to the bus connection. The processor 92 is any of various processors such as a CPU (Central Processing Unit), a GPU (Graphics Processing Unit), and an FPGA (Field-Programmable Gate Array). The memory 93 is a main storage device realized by using RAM (Random Access Memory) or the like. The storage device 94 is an auxiliary storage device realized by using a hard disk, an SSD (Solid State Drive), a memory card, a ROM (Read Only Memory), or the like.

The input/output interface 95 is an interface for connecting the computing device 9 and the input/output device. For example, an input device such as a keyboard and an output device such as a display device are connected to the input/output interface 95.

The external interface 96 is an interface for connecting the computing device 9 to the network 11 or the like. FIG. 11 describes a case in which the external interface 96 is a network interface and is connected to the network 11, but this disclosure is not limited thereto. In the case of the figure, this network is, for example, LAN (Local Area Network) or WAN (Wide Area Network). The method of connecting the external interface 96 to the network may be a wireless connection or a wired connection.

The external interface 96 may be an interface for directly connecting an external device instead of a network interface. For example, it may be directly connected to the camera 12 without going through a network, such as by USB (Universal Serial Bus), IEEE1394, or the like.

Moreover, the camera 12 is connected to the network 11, and the computing device 9 and the camera 12 can communicate data via the network 11. In this case, the camera 12 corresponds to the imaging device 2 of the biometric authentication device 1.

The storage device 94 stores a program module that realizes each processing unit of the biometric authentication device 1. The processor 92 realizes a function corresponding to each program module by reading each of these program modules into the memory 93 and executing the program module.

Note that some functions of the biometric authentication device 1 may be executed on the camera 12 side. That is, a processor, a storage device, and memory may be housed inside the camera 12, all or some of the processing of each processing unit of the biometric authentication device 1 may be executed by using these components. For example, the image information acquisition unit 101, the in-focus determination unit 102, the feature point extraction unit 103, the distance estimation unit 104, the correction unit 105 (105a), the focal point control unit 106, the image selection unit 107, and the biometric authentication unit 108 may be executed on the camera 12 side, with other processes being executed on the computing device 9 side. Alternatively, the processing of the feature point extraction unit 103 may also be executed on the camera 12 side, and the other processing may be executed on the computing device 9 side. Alternatively, all the processes other than the biometric authentication unit 108 may be executed on the camera side.

Figure 12:
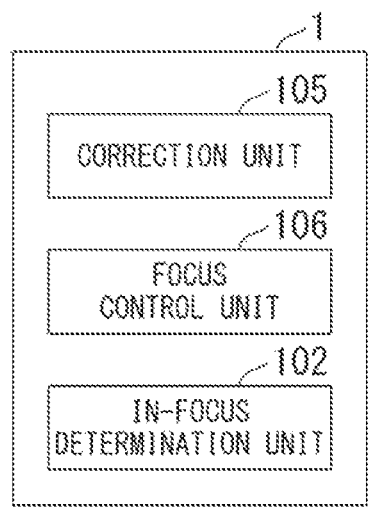
FIG. 12 is a diagram showing a minimum configuration diagram of a biometric authentication device.

FIG. 12 is a diagram showing a minimum configuration diagram of the biometric authentication device 1.

The biometric authentication device 1 is provided with the correction unit 105, the focal point control unit 106, and the in-focus determination unit 102.

Figure 13:
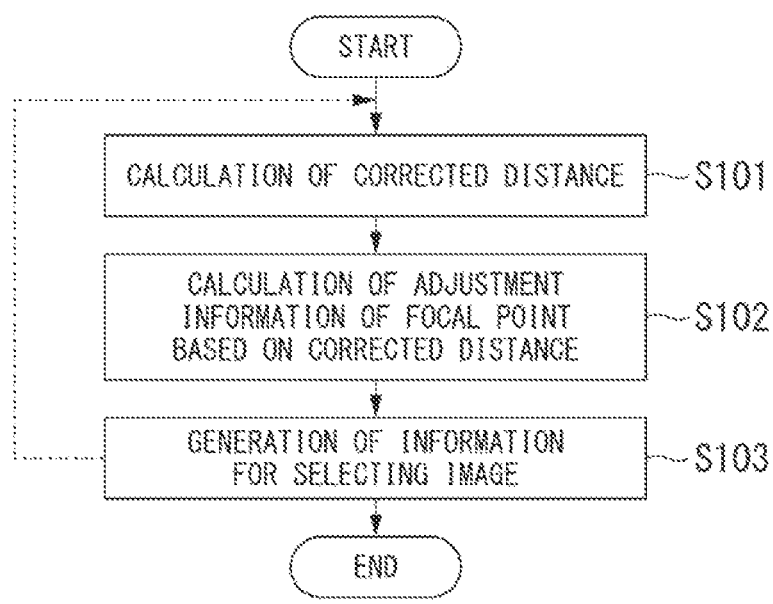
FIG. 13 is a diagram showing a processing flow diagram of a biometric authentication device in a minimum configuration.

FIG. 13 is a diagram showing a processing flow diagram of the biometric authentication device in the minimum configuration shown in FIG. 12.

The correction unit 105, by utilizing difference distance information obtained on the basis of in-focus information indicating the degree of focusing in an image of a subject serving as the target of biometric authentication and an estimated distance to the subject obtained from the distance between feature points in the image, the difference distance information indicating the deviation between the estimated distance and the focal distance to the subject, generates a corrected distance in which the deviation between the estimated distance and the focal distance to the subject has been corrected on the basis of the difference distance information (Step S101).

The focal point control unit 106 generates information for controlling a focal point during image acquisition of the subject on the basis of the corrected distance (Step S102).

The in-focus determination unit 102 generates information for selecting an image to be biometrically authenticated from among images of the subject photographed after controlling the focal point (Step S103).

The above process may be repeated until a focused image capable of performing authentication with a predetermined accuracy in biometric authentication is obtained.

As described above, the biometric authentication device 1 is able to focus at high speed in consideration of individual differences. Therefore, it is possible to focus at high speed when photographing in focus from the second time onward, and even if the first image acquisition fails, biometric authentication can be performed at high speed.

Further, the biometric authentication device 1 has the effects of not requiring an additional device and enabling higher image quality, which leads to improvement in the accuracy of biometric authentication.

Further, by using the biometric authentication device 1, it becomes possible to focus at high speed and perform biometric authentication even if there is no sensor for measuring the distance to the subject serving as the target of biometric authentication. It can moreover be used regardless of whether the person to be biometrically authenticated is stationary or moving. Therefore, it can be used for a biometric authentication system for payments, a biometric authentication system for a gate while walking, and the like.

The present disclosure has been described above as an example of applying the above-mentioned exemplary embodiment. However, the technical scope of the present disclosure is not limited to the scope described in each of the above-described embodiments. It will be apparent to those skilled in the art that various changes or improvements can be made to such embodiments. In such cases, new embodiments with such changes or improvements may also be included in the technical scope of the present disclosure. This is clear from the matters disclosed in the claims.

REFERENCE SIGNS LIST

1: Biometric authentication device
2: Imaging device
3: Portable medium
10, 10a, 10b, 10c: Adjustment unit
101: Image information acquisition unit
102, 102c: In-focus determination unit
103: Feature point extraction unit
104: Distance estimation unit
105, 105a, 105b: Correction unit
106: Focus control unit
107: Image selection unit
108: Biometric authentication unit
109: Image analysis unit

What is claimed is:

1. A biometric authentication device comprising:
at least one memory configured to store instructions; and
at least one processor configured to execute the instructions to:
generate, by utilizing difference distance information obtained, for each subject, on the basis of in-focus information indicating the degree of focusing in an image of a subject serving as the target of biometric authentication and an estimated distance to the subject obtained from the distance between feature points in the image, the difference distance information for each subject having individual differences between subjects and indicating a deviation between the estimated distance and a focal distance to the subject in which the in-focus information indicates that the image is in focus, a corrected distance in which the deviation between the estimated distance based on the image of the subject and the focal distance to the subject has been corrected on the basis of the difference distance information for the subject;
generate information for controlling a focal point during image acquisition of the subject on the basis of the corrected distance; and
generate information for selecting an image to be biometrically authenticated from among images of the subject photographed after controlling the focal point.

2. The biometric authentication device according to claim 1, wherein the at least one processor is configured to execute the instructions to search for the difference distance information for calculating the corrected distance for an image of the subject having a different corrected distance, using the in-focus information of the image.

3. The biometric authentication device according to claim 2, wherein the at least one processor is configured to execute the instructions to generate, after the difference distance information is searched for, the corrected distance by correcting the estimated distance obtained from the image of the subject after the search based on the searched difference distance information.

4. The biometric authentication device according to claim 2, wherein the at least one processor is configured to execute the instructions to generate a distance around the estimated distance as the corrected distance in order to search for the difference distance information.

5. The biometric authentication device according to claim 2, wherein the at least one processor is configured to execute the instructions to generate, in a case where an image of the subject moving is acquired, the corrected distance by using the distance moved by the subject by the time of the next image capture in order to search for the difference distance information.

6. The biometric authentication device according to claim 1, wherein the at least one processor is configured to execute the instructions to correct, upon receiving input of the difference distance information, the estimated distance using the input difference distance information and generates the corrected distance.

7. The biometric authentication device according to claim 1, wherein the at least one processor is further configured to execute the instructions to:
at least either generate, in a case where a facial image of the subject is acquired, accessory information by detecting an accessory of the face in the subject or calculate orientation information on an orientation of the face; and
change the method of generating the corrected distance based on one or both of the accessory information and the orientation information.

8. The biometric authentication device according to claim 7, wherein the at least one processor is further configured to execute the instructions to change the selection criteria of an image for biometric authentication from an image of the subject based on the accessory information or the orientation information.

9. The biometric authentication device according to claim 1, wherein the at least one processor is configured to execute the instructions to:

generate, in a case where the difference distance information in which the in-focus information indicates that the image is in focus is not obtained, for an image of the subject having a different corrected distance, the corrected distance while searching for the difference distance information by using the in-focus information of the image; and generate, after the difference distance information is searched for, the corrected distance by correcting the estimated distance obtained based on an image of the subject after the search on the basis of the searched difference distance information.

10. The biometric authentication device according to claim 9, wherein the at least one processor is configured to execute the instructions to re-search the difference distance information, in a case where the estimated distance has changed by a certain percentage or more from an initial estimated distance after searching for the difference distance information.

11. The biometric authentication device according to claim 1, wherein the at least one processor is configured to execute the instructions to generate the corrected distance so that the in-focus image can be acquired at a time ahead.

12. The biometric authentication device according to claim 1, wherein the difference distance information for the subject is obtained by subtracting the estimated distance to the subject from the corrected distance.

13. The biometric authentication device according to claim 1, wherein the difference distance information is obtained on the basis of the in-focus information and the estimated distance to the subject within a certain time in a past.

14. The biometric authentication device according to claim 1, wherein the at least one processor is configured to execute the instructions to generate the corrected distance, by utilizing the difference distance information which is different according to the target.

15. The biometric authentication device according to claim 1, wherein the at least one processor is configured to execute the instructions to generate, by utilizing the difference distance information having individual differences according to the distance between feature points between subjects, the corrected distance in which the deviation between the estimated distance to the subject obtained from the distance between feature points in the image of the subject and the focal distance to the subject has been corrected on the basis of the difference distance information for the subject.

16. The biometric authentication device according to claim 2, wherein the at least one processor is configured to execute the instructions to store a set of the deviation and the estimated distance for each time of being in focus, and obtain a function for finding the deviation from the estimated distance based on a plurality of sets of the deviation and the estimated distance as the difference distance information.

17. The biometric authentication device according to claim 2, wherein the at least one processor is configured to execute the instructions to determine the difference distance information to be obtained, according to a degree of distance from the subject at a time of being in focus.

18. A biometric authentication method comprising:

generating, by utilizing difference distance information obtained, for each subject, on the basis of in-focus information indicating the degree of focusing in an image of a subject serving as the target of biometric authentication and an estimated distance to the subject obtained from the distance between feature points in the image, the difference distance information for each subject having individual differences between subjects and indicating a deviation between the estimated distance and a focal distance to the subject in which the in-focus information indicates that the image is in focus, a corrected distance in which the deviation between the estimated distance based on the image of the subject and the focal distance to the subject has been corrected on the basis of the difference distance information for the subject;

generating information for controlling a focal point during image acquisition of the subject on the basis of the corrected distance; and generating information for selecting an image to be biometrically authenticated from among images of the subject photographed after controlling the focal point.

19. A non-transitory computer-readable medium containing instructions thereon, which, when executed by a computer processor, causes the processor to execute operations comprising:

generating, by utilizing difference distance information obtained, for each subject, on the basis of in-focus information indicating the degree of focusing in an image of a subject serving as the target of biometric authentication and an estimated distance to the subject obtained from the distance between feature points in the image, the difference distance information for each subject having individual differences between subjects and indicating a deviation between the estimated distance and a focal distance to the subject in which the in-focus information indicates that the image is in focus, a corrected distance in which the deviation between the estimated distance based on the image of the subject and the focal distance to the subject has been corrected on the basis of the difference distance information for the subject;

generating information for controlling a focal point during image acquisition of the subject on the basis of the corrected distance; and generating information for selecting an image to be biometrically authenticated from among images of the subject photographed after controlling the focal point.

* * * * *